United States Patent [19]

Ogikubo

[11] Patent Number: 5,396,282
[45] Date of Patent: Mar. 7, 1995

[54] IMAGE MAPPING RADIOMETER WITH A BAND-TO-BAND REGISTRATION DEVICE

[75] Inventor: Kazuhiro Ogikubo, Tokyo, Japan
[73] Assignee: NEC Corporation, Tokyo, Japan
[21] Appl. No.: 981,313
[22] Filed: Nov. 25, 1992
[30] Foreign Application Priority Data Nov. 26, 1991 [JP] Japan .................. 3-310889

[51] Int. Cl.⁶ .............................................. H04N 7/18
[52] U.S. Cl. ................................ 348/144; 348/166; 348/175
[58] Field of Search ............... 358/109; 250/201.7; 348/144, 147, 164, 166, 175; H04N 7/18

[56] References Cited

U.S. PATENT DOCUMENTS 5,270,528 12/1993 Ogikubo ..................... 250/201.7

FOREIGN PATENT DOCUMENTS 2327355 5/1973 Germany .
61-288683 12/1986 Japan .
61-288687 12/1986 Japan .

OTHER PUBLICATIONS

Patent Abstracts of Japan, vol. 11, No. 152, 16 May 1987 61-288684 Test Chart for Measuring Registration of Solid State Image-Pickup Element.
Patent Abstracts of Japan, vol. 11, No. 152, 16 May 1987.
Y. Ishizawa et al., "The Development of Multispectral . . . Radiometer for MOS-1", Proceedings of the 14th Int'l Symp on Space Technology and Science, Tokyo, 1984, pp. 1313–1319.
J. Midan, "The Spot–HRV Instrument: An Overview of Design and Performance", 34th Congress of the International Astronautical Federation, Budapest, Hungary, Oct. 10–15, 1983, pp. 1–9.

Primary Examiner—Howard W. Britton
Attorney, Agent, or Firm—Sughrue, Mion, Zinn, Macpeak & Seas

[57] ABSTRACT

An image mapping radiometer mounted on a craft flying an orbit above an object zone. The radiometer includes main optics having in the visible field thereof a unit object zone defined by the swath width over the object zone and a distance in the direction of orbit, and a plurality of linear photoelectric detectors each being assigned to one of a plurality of observation spectral bands and located in the focal plane of the main optics, thereby sequentially imaging the unit object zone. A correcting section has correction optics for projecting a correction pattern onto the photoelectric detectors so as to correct the band-to-band registration, i.e., the positional deviation between the elements of the detectors. A movable mirror is provided for selecting either of the main optics and correction optics. When the correction pattern is projected, a lattice pattern having a pitch different from the element pitch is generated on the light-sensitive surfaces of the detectors. The correction is effected by calculating the output signal levels of the detectors associated with the projected image on the basis of a vernier principle.

12 Claims, 8 Drawing Sheets

IMAGE MAPPING RADIOMETER WITH A BAND-TO-BAND REGISTRATION DEVICE

BACKGROUND OF THE INVENTION

The present invention relates to a radiometer and, more particularly, to a multiband image mapping radiometer mounted on a spacecraft, aircraft or similar craft flying over an object zone to be imaged, e.g., the ground surface of the earth.

A radiometer of the type described is used for remote sensing an object zone extending along the flight path of a craft. Typical of such a radiometer is a multi-spectral scanner (MSS) or a thematic mapper (TM) mounted on LANDSAT which is one of spacecrafts For remote sensing developed by NASA (National Aeronautics and Space Administration).

Recently proposed are a multi-spectral selfscanning radiometer (MESSR) as disclosed in a paper entitled "THE DEVELOPMENT OF MULTISPECTRAL SELF-SCANNING RADIOMETER FOR MOS-1", PROCEEDINGS OF THE FOURTEENTH INTERNATIONAL SYMPOSIUM ON SPACE TECHNOLOGY AND SCIENCE issued in Tokyo in 1984,, pp. 1313-1319, and a high resolution visible camera (HRV) as disclosed in a paper IAF-83-109 entitled "The SPOT-HRVI Instrument: An overview of Design and Performance" and presented at the 34th CONGRESS OF THE INTERNATIONAL ASTRONAUTICAL FEDERATION held in Budapest in 1983. The ESSR AND HRV are image mapping radio meters of the type using a linear CCD (Charge Coupled Device) array as a photoelectric transducer.

The image mapping radiometers described above each measures the intensity of visible rays or infrared rays radiated or reflected by the object zone of the ground surface, i.e., the radiance and generates an image made up of pixels of lightness matching the measured radiance. Generally, this kind of radiometer is provided with a multi-spectral band, or simply multi-band, construction which divides the visible rays or infrared rays into a plurality of wavelength bands, i.e., spectral bands and generates an image in each of the bands. A camera section is included in the radiometer and constituted by optics for converging the radiation or reflection from the object zone into a radiant flux corresponding to the radiance, and a detector including a photoelectric tube for converting the radiant flux to an electric signal and a linear CCD array or similar photoelectric device. The radiant flux is divided into the above-mentioned plurality of bands by split optics located on the optical path and implemented by a band separation mirror or a prism. Detectors each being assigned to one of the bands are located at the focal points of the respective bands for converting the incident divided fluxes to corresponding electric signals. The MSSR using linear CCD arrays as the detectors has three bands for visible rays and one band for infrared rays, i.e., four spectral bands in total. Therefore, the radiant flux is divided into four and detected by four detectors. When the detectors assigned to the respective bands are deviated in position from one another or when the optical paths defined by optics assigned one-to-one to the detectors are not identical with designed ones, the received images of the associated bands are deviated from one another with respect to the positions of the pixels. Matching the positions of the pixels is generally referred to as registration. Also, matching the positions of the multiband images is called band-to-band registration.

In the MSS, TM or similar image mapping radiometer of mechanical scanning type using oscillation or rotatable mirror, only several or slightly more than ten photoelectric transducer elements suffice for each band, allowing the band-to-band registration to be readily set up. Specifically the MSS assigns six photoelectric transducer elements to each band while the TM assigns sixteen photoelectric transducer elements to each band (four elements to one of the bands). Further, the pitch of the transducer elements corresponding to the pixel pitch is as great as about 100 microns. Therefore, the allowable alignment error of transducer elements in The event of assembly of the detectors is as great as about one-tenth of the pixel pitch. In addition, the band-to-band registration changes little despite the shock ascribable to launching, temperature changes and other external factors.

On the other hand, the MBSSR, HRV or similar multiband image mapping radiometer includes linear CCD array as detectors. With this type of radiometer, it is necessary to effect the registration with each of the plurality of CCD elements of each CCD array assigned to a particular band. Specifically, each linear CCD array has 2,048 CCD elements, an element pitch of 14 microns, and a focal plane which is 28.67 millimeters long. Hence, assuming that the allowable band-to-band registration error is within 0.1 pixel as with the MSS, then the maximum allowable error of deviation between the associated elements of the different bands in the lengthwise direction is 1.4 microns. Regarding a multiband radiometer of electronic scanning type under development and having about 5,000 CCD elements, the pixel pitch is about 7 microns and, therefore, the maximum allowable band-to-band registration error is 0.7 microns. Confining the error in such a range by the state of the art technologies is extremely difficult. More specifically, with the MESSR or HRV, it is difficult to set up the band-to-band registration although it has the essential advantage of electronic scanning that a dwell time, i.e., a period of time for observing a target is long for the same resolution and the same swath width and, therefore, the optics can be miniaturized and the structure is free from movable portions and, therefore, simple.

Remote sensing using the multiband radiometer not only processes a plurality of bands of images separately but also extracts characteristics by comparing the characteristics of the band-by-band images of the object zone. For this reason, a multiband image which is the combination of the plurality of bands of images is often used.

On the other hand, the conventional radiometers of the type concerned lack a mechanism for detecting an adjustment error which may occur in the band-to-band registration. It has been customary, therefore, to adjust or correct the band-to-band registration when the radiometer is produced or when it is mounted on a craft. Moreover, with any of the conventional radiometers, a deviation of band-to-band registration ascribable to the deformation of structural bodies and detector mounting portions due to the shock of launching, temperature changes and so forth cannot be detected once the craft is launched. Geometric correction to be effected on the earth and using a particular target position on an actual image as a reference has been the only implementation available for the band-to-band registration after launching. Specifically, geometric correction selects several target points on an image of given band, i.e., the tips of peninsulas or similar characteristic points on the earth having noticeable differences in output level, and measures, by using the pixel positions of the output image and time as a reference, the deviations of the target points on the images of the other bands on a pixel basis, thereby correcting the image processing parameters. The geometric correction scheme, however, cannot cope with the number of pixels and the amount of image processing which are increasing to meet the demand for higher resolutions and broader swath widths. More specifically, the amount of information to be processed for the geometric correction is increased due to the increase in resolution and swath width, obstructing the miniaturization of the image processing unit and high speed image processing. In addition, the selection of the characteristic points on the earth is limited by weather, lowering the geometric correction accuracy.

SUMMARY OF THE INVENTION

It is, therefore, an object of the present invention to provide an image mapping radiometer having optical means for measuring a deviation in the relative position of a plurality of detectors built in the radiometer body and each being assigned to respective band, and means responsive to the output of the optical means for correcting the band-to-band registration.

It is another object of the present invention to provide an image mapping radiometer eliminating the need for geometric correction of the band-to-band registration otherwise effected on the earth, thereby promoting high speed image processing and simplifying an image processing unit.

It is another objet of the present invention to provide an image mapping radiometer capable of effecting accurate band-to-band registration with a band-to-band registration correcting function without being effected by the weather of an object zone.

In accordance with the present invention, there is provided an image mapping radiometer mounted on a craft flying over an object zone of the ground surface along an orbit having a predetermined relation with the object zone, and comprising first optics having in a visual field thereof a unit object zone defined by a predetermined width of the object zone and a distance in a flying direction of the craft and dividing visible rays or infrared rays from the unit object zone into rays of a first spectral band and rays of a second spectral band and focusing the rays onto a first and a second focal plane, respectively, and first and second photoelectric transducer means located in the focal plane and each comprising an array of photoelectric transducer elements for detecting a radiance distribution of the rays of respective one of the first and second spectral bands in the focal plane, thereby sequentially picking up optical images in the first and second spectral bands of the unit object zone entering the visual field as the craft flies. Correction pattern forming means has a movable mirror selectively movable into an optical path defined by the first optics. The correction pattern forming means forms on the first and second photoelectric transducer elements an optical image of a correction pattern in the form of a stripe pattern for determining whether or not the photoelectric transducer elements of the first and second photoelectric transducer means are aligned with each other in the first and second focal planes. Optical path switching means controls the movement of said movable mirror into the optical path.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
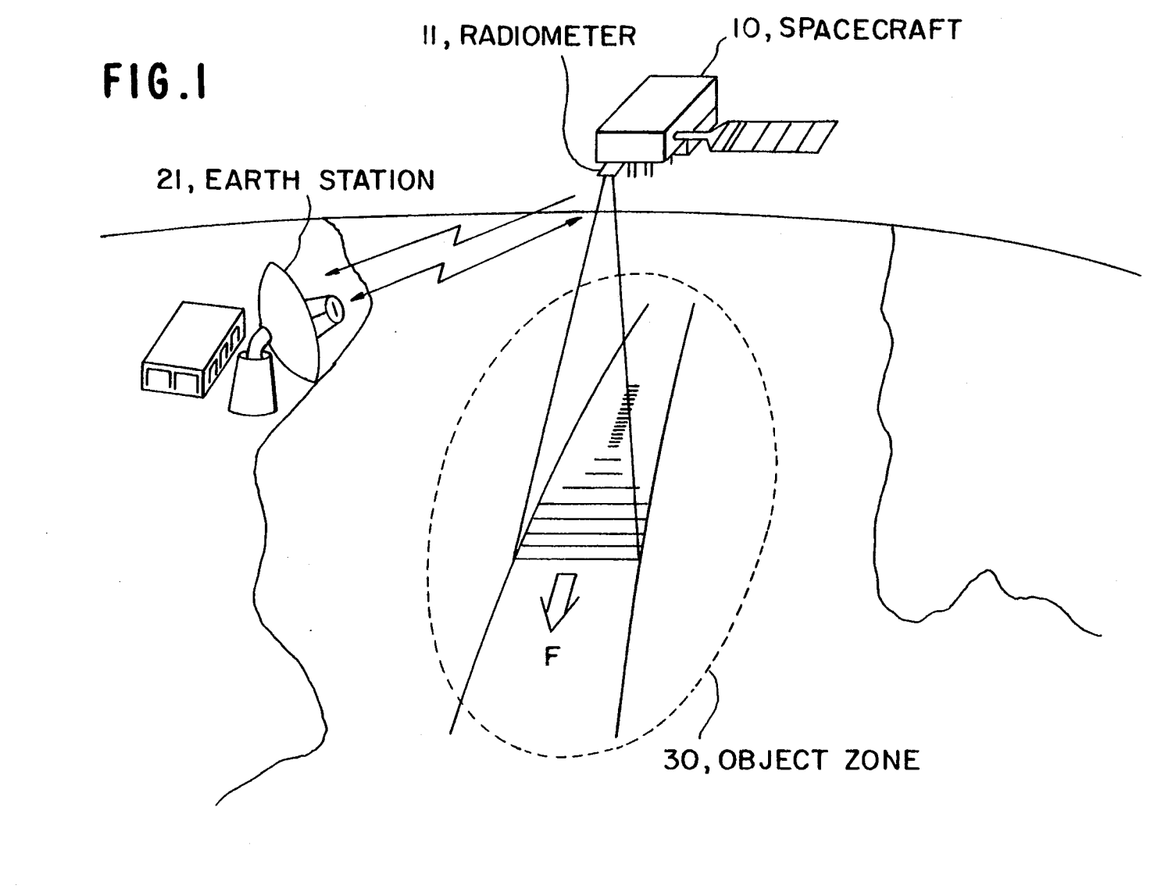
FIG. 1 shows a specific remote sensing system using a conventional image mapping radiometer.

Referring to FIG. 1 of the drawings, a remote sensing system using a conventional image mapping radiometer is shown. As shown, a radiometer 11 is mounted on a spacecraft 10 and scans the ground surface of the earth in a zone, e.g., over a swath width of 100 kilometers in a direction F, thereby collecting data associated with the object zone 30 with a ground surface resolution of 50 meters. The collected data is processed by a data processing section included in the radiometer 11 and then sent to an earth station 21 via a radio data link transmitter. On the other hand, the earth station 21 sends to the spacecraft 10 position data on the orbit of the spacecraft 10 and based on a predetermined schedule, and control data for setting the sensitivity of the radiometer 11 matching the land/sea of the object zone at each position, as commands over a radio data link. On receiving the position data and control data, the spacecraft 10 generates a control signal meant for the radiometer 11.

Assume that the spacecraft 10 flies a sun synchronous orbit, and that the orbit has an altitude of 900 kilometers, an inclination angle of 99 degrees, and a period of 103 minutes, i.e., a ground surface scanning rate of about 6.7 kilometers per second. The data transmission over the radio data link can be done only when the spacecraft 10 is visible from the earth station 21, i.e., only for about 15 seconds per round.

Figure 2:
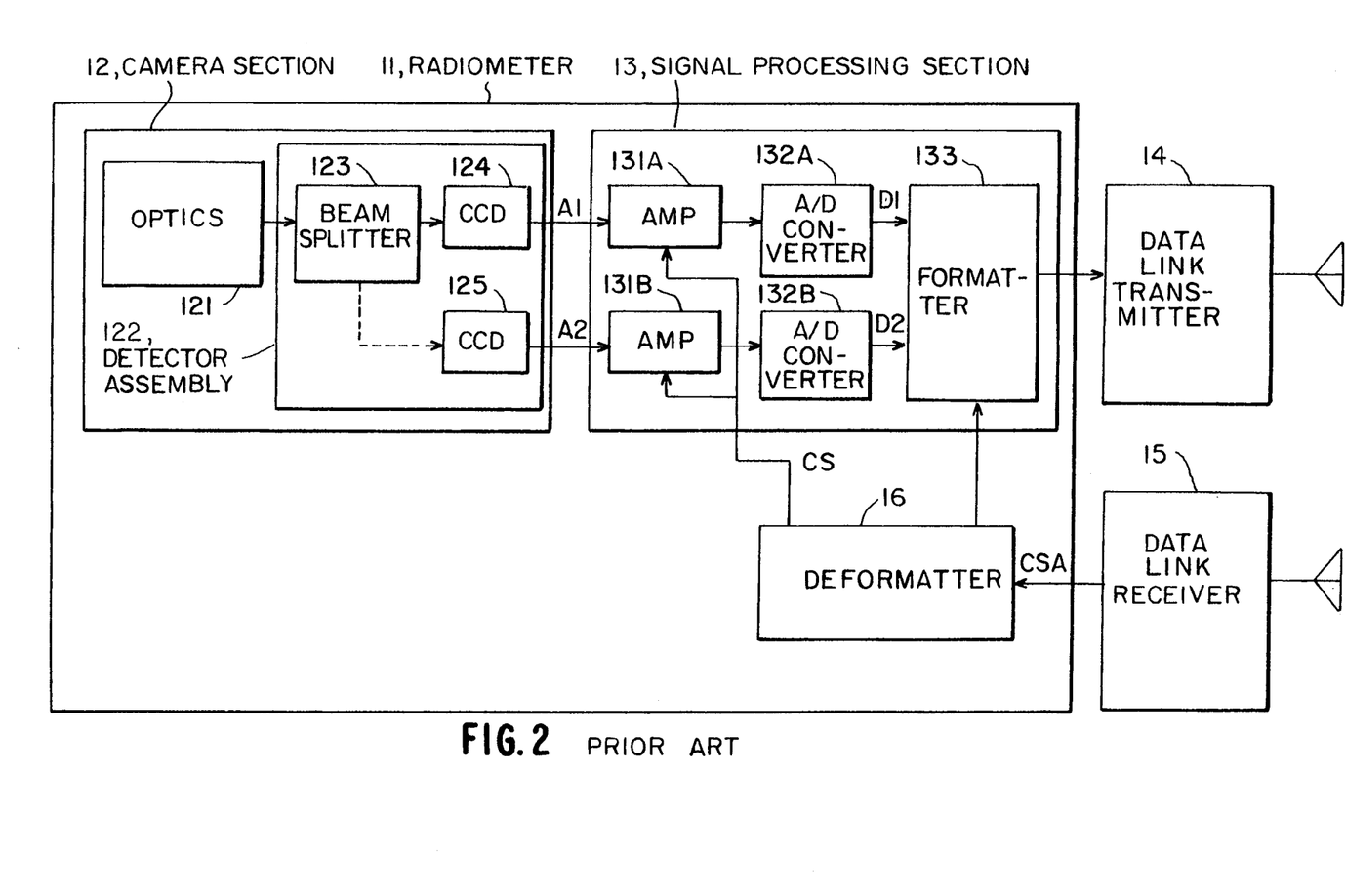
FIG. 2 is a block diagram schematically showing a conventional radiometer of the type described.

As shown in FIG. 2, the radiometer 11 includes a camera section 12 made up of optics 121 and a detector assembly 122. A signal processing section 13 sends the output data of the camera section 12 to the earth station 21 via a radio data link transmitter 14. A data link receiver 15 receives commands from the earth station 21. A deformatter 16 separates the commands from the earth station 21 into control commands meant for the signal processing section 13 and other commands. The detector assembly 122 included in the camera section 12 has four linear CCD arrays each being assigned to one of four object bands 1-4 and each having 2,000 CCD elements, setting up a ground surface resolution of 50 meters. Let the following description concentrate on two of the four CCD arrays for simplicity.

Figure 3:
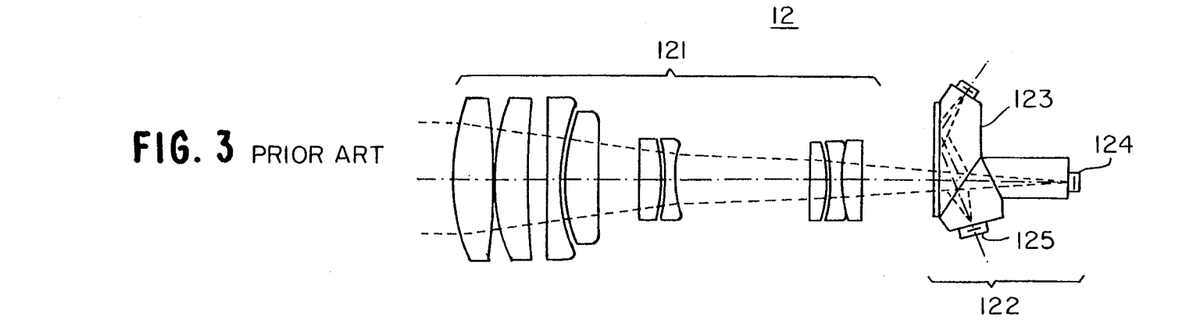
FIG. 3 shows optics included in the radiometer of FIG. 2.

As shown in FIG. 3, the detector assembly 122 has a beam splitter 123 implemented by a prism or similar beam splitting device for splitting the incident light into two spectral bands 1 and 2, and CCD arrays 124 and 125 assigned to the bands 1 and 2, respectively, and each having 2,000 CCD elements, an element pitch of 14 microns, and a focal plane which is 28.7 millimeters long.

Referring again to FIG. 2, the signal processing section has amplifiers 131A and 131B, analog-to-digital converters (ACDs) 123A and 123B, and a formatter 133. The amplifiers 131A and 131B amplify respectively the output signals of the CCD arrays 124 and 125 by a gain determined by a gain control signal fed from the deformatter 16. The ADCs 123A and 123B convert respectively the output signals of the amplifiers 131A and 131B to 8-bit digital signals. The formatter 133 mutiplexes the resulting digital data and a telemeter signal adapted to monitor the operating state of the spacecraft 10 by time division multiplexing.

Figure 4:
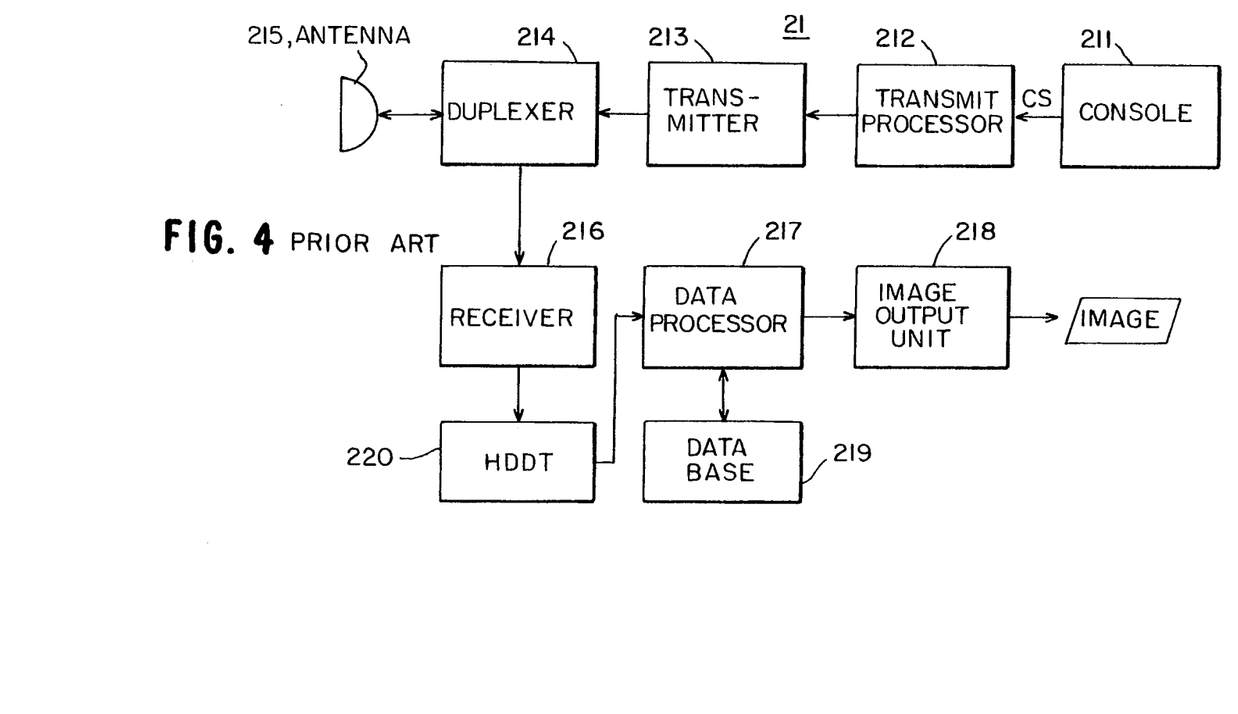
FIG. 4 is a block diagram schematically showing an earth station included in the system of FIG. 1.

As shown in FIG. 4, the earth station 21 includes a console 211 for setting control commands including a sensitivity set command. A transmit processor 212 transforms the control commands to signals to be transmitted. A transmitter 213 has an input terminal connected to the transmit processor 212 and an output terminal connected to a duplexer 214 which duplexes the transmission and reception. An antenna 215 traces the spacecraft 10. A high density digital tape recorder (HDDT) 220 is used to temporarily record data received by a receiver 216. A data processor 217 processes the received data from the HDDT 220 by referencing data from a data base 219, thereby producing image data. An image output unit 218 converts the image data to an image and outputs the image. The data base 219 includes geometric correction data for band-to-band registration.

In operation, at the earth station, position data on the orbit of the spacecraft 10 and land/sea and flat/mountainous data associated with the object zone 30 are generated by the console on the basis of the imaging schedule of the zone 30. By such data, the earth station 211 sets the sensitivity of the radiometer 11 at 0 decibel. The transmit processor 212 multiplexes the resulting sensitivity set command CS with other control commands to be sent to the spacecraft 10 and then feed them to the transmitter 213 as control commands. The transmitter sends the control commands to the spacecraft 10 via the duplexer 213 and antenna 215, On the spacecraft 10, the data link receiver 15 receives the control commands and delivers them to the deformatter 16 as control signals CSA. In response, the deformatter 16 separates the control commands meant for the signal processing section 13 and decodes, among the control commands, the sensitivity set command CS, The decoded sensitivity set command CS is applied to the amplifiers 131A and 131B as a sensitivity control signal SS. This signal SS controls the amplifies 131A and 131B to a gain H matching the sensitivity of 0 decibel. Analog data A1 and A2 from the CCD arrays 124 and 125 of the camera section 12 are respectively amplified by the amplifiers 131A and 131B whose gain now matches the sensitivity of 0 decibel. The outputs of the amplifies 131A and 131B are respectively digitized by the ADCs 132A and 132B to become 8-bit digital data D1 and D2. The digital data D1 and D2 are subjected to parallel-to-serial conversion at the formatter 133 and then formatted together with the above-mentioned house keeping data. The output of the formatter 133 is sent to the earth station 21 via the data link transmitter 14.

At the earth station, the data coming in through the antenna 215 is routed through the duplexer 214 to the receiver 216 and then recorded in the HDDT 220. At the same time, the received data is fed from the receiver 216 to the data processor 217. In response, the data processor 217 corrects scanning distortions of the received data as well as irregularities in the sensitivity of the detectors by referencing the data of the data base 219, thereby generating image data. This part of the processing is executed with each of the bands 1 and 2, i,e., with the output data of each of the CCD arrays 124 and 125. Hence, the resulting image is a single band image of the band 1 and that of the band 2. When the images of the bands 1 and 2 should be superposed to generate a multiband image, the data processor 217 will further execute geometric correction for band-to-band registration by referencing CCD 124/125 data also filed in the data base 219. The band-by-alignment band output data associated with the bands 1 and 2 are outputted by the image output unit 218 as respective band images. The image output unit 218 is implemented as a high density film recorder, These images are monochromatic and have pixels whose lightness is proportional to the level of he image data. Usually, a certain color is assigned to each of the bands 1 and 2 for discrimination, e.g., red and green are respectively assigned to the bands 1 and 2 beforehand. Then, the output image will be a multicolor image consisting of red and green. The image produced by such a scheme is referred to as a false image. It is to be noted that the transmission of the commands and the reception of the image data are completed within the communication time available with the radio data link, i.e., about 15 minutes.

Figure 5A:
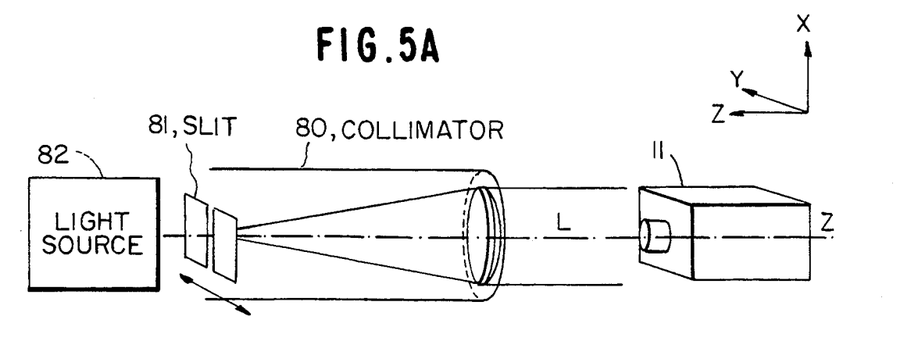
FIG. 5A demonstrates how to adjust and test band-to-band registration particular to the conventional radiometer.
Figure 5B:
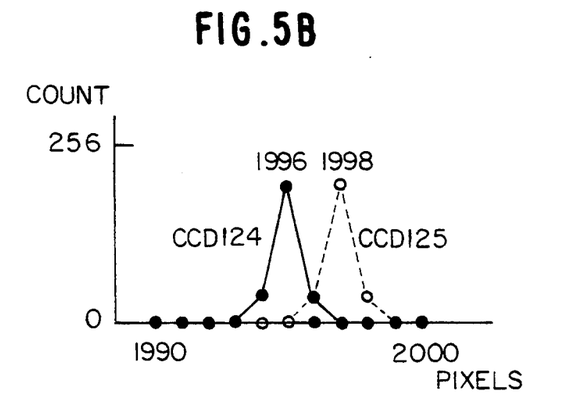
FIG. 5B is a graph plotting the results of specific tests.

A reference will be made to FIGS. 5A and 5B for describing how to adjust and correct band-to-band registration on the earth. As shown in FIG. 5A, a collimator 80 is provided with a slit 81 at the focus thereof and a light source 82. The collimator 80 is located such that the optical axis (Z axis) thereof aligns with that of the radiometer 11 to be tested. The slit 81 is positioned such that the longitudinal axis (X axis) thereof is perpendicular to the direction in which the photoelectric transducer elements of the CCD arrays 124 and 125 of the radiometer 11 are arranged (Y axis), i.e., such that the widthwise direction of the slit 81 coincides with the Y axis. A parallel beam L for the collimation of the shape of the slit 81 is incident on the radiometer 11. While the slit 81 is sequentially moved along the Y axis, the outputs of the transducer elements of each of the CCD arrays 124 and 125 to be measured, e.g., the elements located at the center and at both ends (fifth, 1000th and 1995th elements) are counted independently of one another. At this instant, the slit 81 is moved in each step corresponding to the element pitch of the CCD arrays 124 and 125. By comparing the positions where the associated elements of the CCD arrays 124 and 125 produce outputs of highest level, it is possible to determine a deviation on an element pitch basis. FIG. 5 indicates that the 1995th elements of the CCD arrays 124 and 125 are deviated from each other by two element pitches. Therefore, the CCD arrays 124 and 125 are so adjusted as to minimize the square mean of the deviation of each of the center element and end elements and then built in the detector assembly 122. The deviation data finally produced by the adjustment is the alignment data of the CCD arrays 124 and 125.

The focal length of the collimator 80 is selected to be about ten times as great as the focal length of the radiometer 11, so that the moving step is also about ten times as great as the element pitch. Specifically, assuming that the focal length of the radiometer 11 is 250 millimeters, then the focal length of the collimator 80 is 2.5 meters; since the element pitch is 14 microns, as stated earlier, the moving step is 140 microns, The alignment data obtained by the above procedure is stored in the data base 219 which is included in the data processor 217 of the earth station 21 for geometric correction. The position data and posture data of the spacecraft 10 on the orbit are compared with the data read out of the data base 219 to allow geometric correction to be effected with the outputs of the CCDs 124 and 125 band by band. As a result, the band-to-band registration on the output image is corrected.

Figure 6:
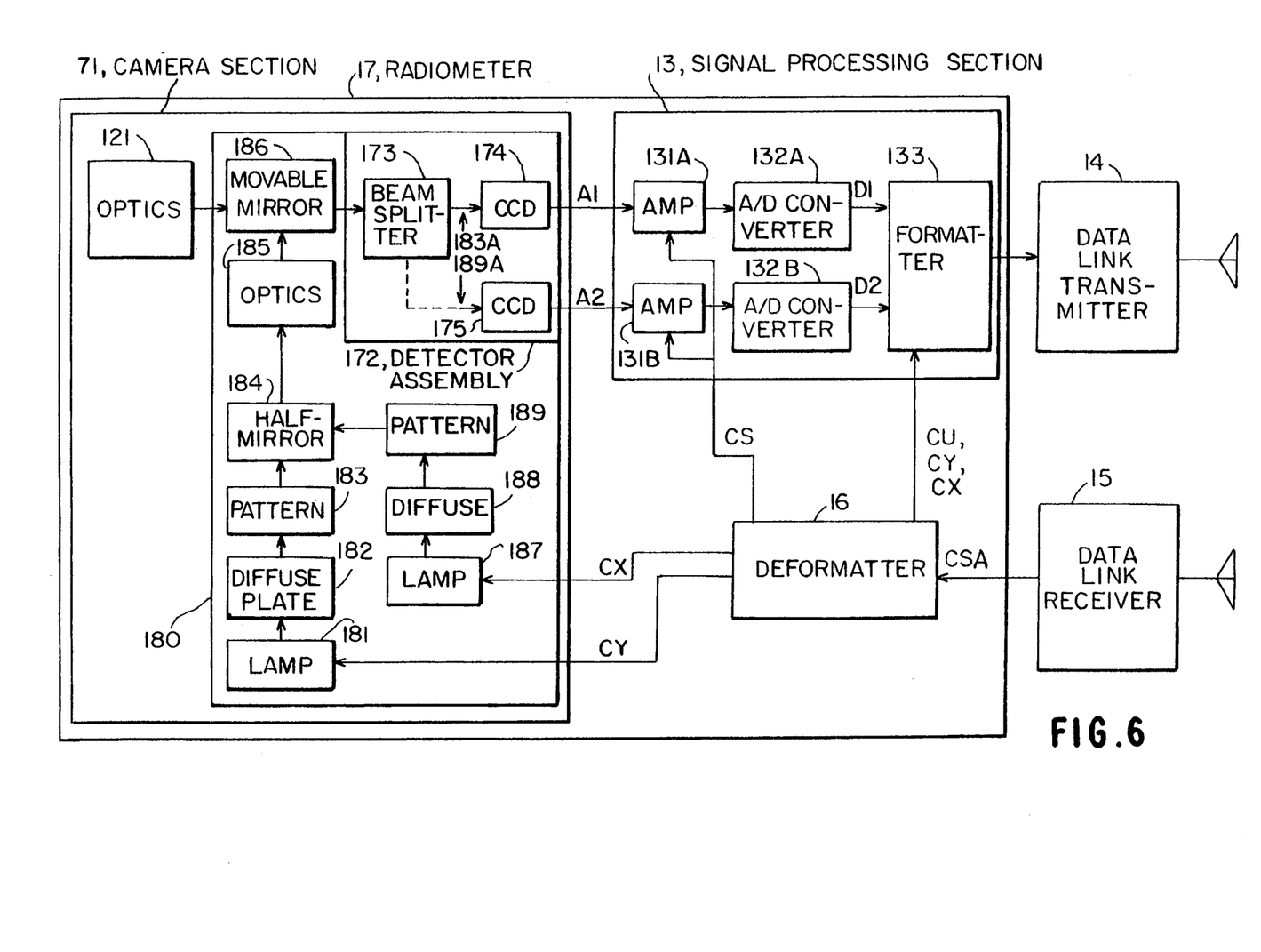
FIG. 6 is a block diagram schematically showing a radiometer embodying the present invention.

Referring to FIGS. 6–9, 10A and 10B, an image mapping radiometer with a band-to-band registration device embodying the present invention will be described. As shown in FIG. 6, the radiometer, generally 17, includes a camera section 71 having optics 121 similar to the optics of the conventional radiometer 11, a detector assembly 172 with an enhanced resolution which will be described, and a correcting section 180 for band-to-band registration test in accordance with the present invention. A signal processing section 13 is identical with that of the conventional radiometer 11. A data link transmitter 14 transits image data to the previously stated earth station 21. A data link receiver 15 receives commands from the earth station 21. A deformatter 16 separates the control commands from the data link receiver 15 into control commands meant for the camera section 71 and other control commands, The radiometer 17, like the conventional radiometer 11, has four bands for observation and a swath width of 100 kilometers, but it has a resolution of 20 meters which is far higher than the conventional one. To set up a sufficient ground surface resolution in each of the bands 1–4, the detector assembly 172 included in the camera section 71 has four linear CCD arrays in each of which 5,000 CCD elements are arranged at a pitch of 7 microns. Again, let the description concentrate on two of the four CCD arrays for simplicity.

Figure 7:
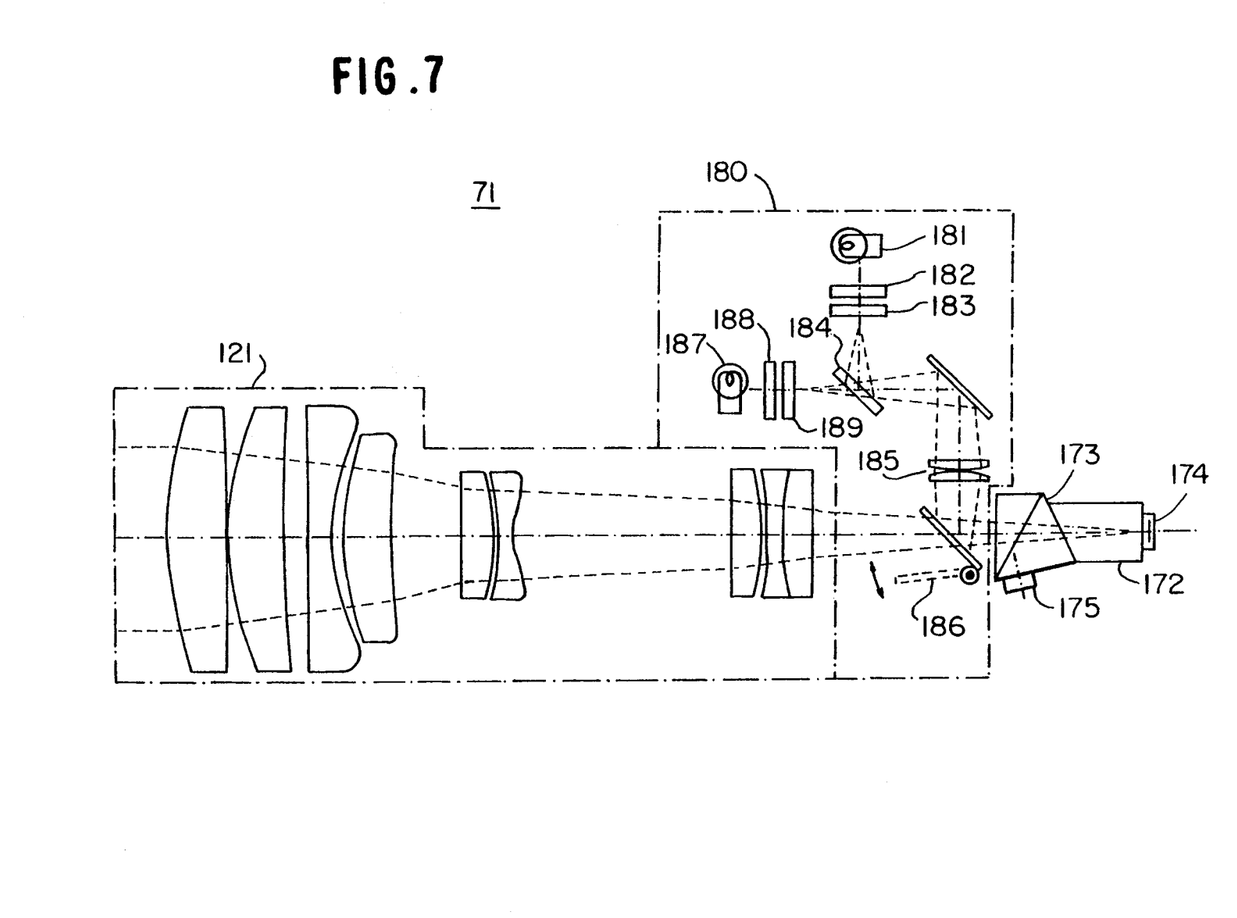
FIG. 7 shows optics included in the embodiment.

As shown in FIG. 7, the detector assembly 172, like the detector assembly 122, is made up of a beam splitter 173 and CCD arrays 174 and 175. The correcting section 180 is constituted by lamps 181 and 187 playing the role of light sources for correction, diffusing plates 182 and 188 for uniformizing respectively the light issuing from the lamps 181 and 182, a pattern 183 for correction parallel to the direction in which the CCD elements are arranged, a pattern 189 for correction perpendicular to the above-mentioned direction, a half-mirror 184, optics 185 for correction, and a movable mirror 186. During observation, the movable mirror 186 is moved away from the optical path to allow the light from the optics 121 enter the detector assembly. In the event of correction, the mirror 186 is located on the optical path to intercept light from the optics 121 while allowing the light from the optics 185 for correction to reach the detector assembly 172.

While usual observation is under way, the earth station 21 sets a command CU for commanding it in addition to a sensitivity set command CS and other control commands on a console 211. The command CU is sent to the spacecraft 10 via a transmit processor 212, a transmitter 213, a duplexer 214, and an antenna 215. The command CU is received by the data link receiver 15 and then separated by the deformatter 16. By the separated command CU, the movable mirror 186 of the correcting section 180 is retracted from the optical path to an observation position. As a result, the light from the optics 121 is incident on the detector assembly 173. This is followed by the same procedure as in the conventional arrangement.

Figure 10A:
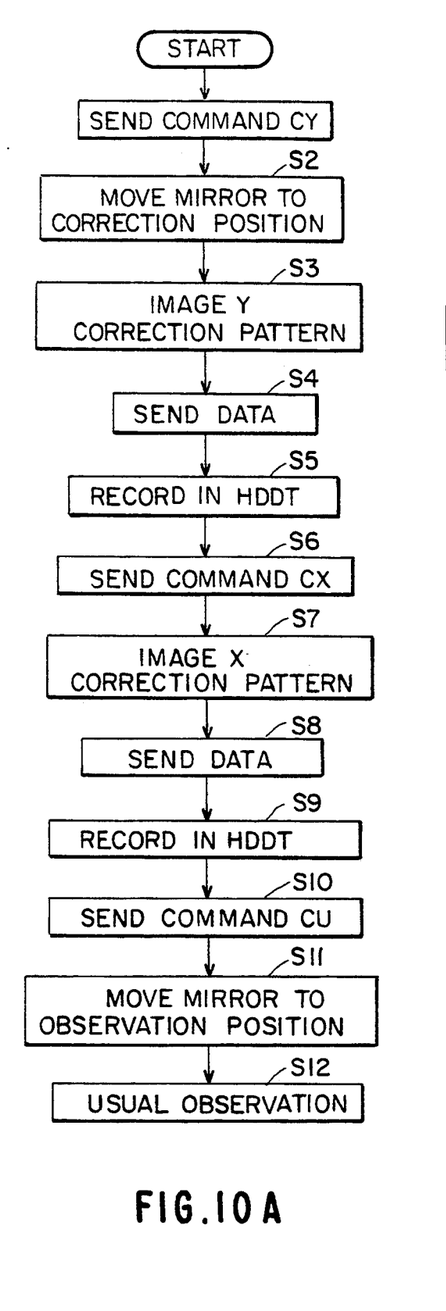
FIG. 10A is a flowchart representative of a band-to-band registration correction procedure particular to the embodiment.

In the event of correction of the band-to-band registration, the earth station 21 sets a command CY commanding the correction in the direction of element arrangement (Y) on the console 211 and then sends it to the spacecraft 10 (step S1, FIG. 10A). In response to the command CY from the deformatter 16, the movable mirror 186 is brought to a correction position on the optical path with the result that the light from the optics 185 is incident on the detector assembly 173 (S2). Then, the lamp 181 is turned on to illuminate the pattern 183 while the diffusing plate 182 sets up a uniform illumination distribution over the entire illumination plane. As a result, an image representative of the pattern 183 is projected onto the detector assembly 172, whereby a projected image 183A is formed on the light-sensitive surfaces of the CCD arrays 174 and 175 (S3). The resulting outputs A1 and A2 of the CCD arrays 174 and 175, respectively, are amplified and digitized by the signal processing section 13 and then sent to the earth station 21 via the data link transmitter 14 as correction data (S4). At the earth station 21, the data associated with the projected image 183A is recorded in the HDDT 220 via the antenna 215, duplexer 214, and receiver 216 (S5). This recording operation is effected for about 10.5 seconds based on the ground scanning rate of 6.7 kilometers per second of the spacecraft 10 and in correspondence with one scene of processed image, e.g., about 70 kilometers. Subsequently, the earth station 21 sets a command CX for commanding correction in the direction (X) perpendicular to the direction of element arrangement and then sends it to the spacecraft 10 (S6). In response to the command CS from the deformatter 16, the lamp 181 is turned off, the lamp 187 is turned on to illuminate the pattern 189 via the diffusing plate 188, and the resulting image of the pattern 189 is projected onto the light-sensitive surface of the CCD arrays 174 and 175 to form a projected image 189A (S7). The resulting outputs of the CCD arrays 174 and 175 are sent to the earth station 21 via the data link transmitter 14 as correction data (S8). In response, the earth station 21 records the data associated with the image 189A in the HDDT 220 for about 10.5 seconds (S9). On fully receiving the sequence of correction data DY and DX, the earth station 21 again sets the command CU and sends it to the spacecraft 10 (S10). Then, in the radiometer 17, the movable mirror 186 of the correcting section 180 is returned to the observation position by the command CU (S11) to allow the usual observation to be resumed (S12).

Figure 10B:
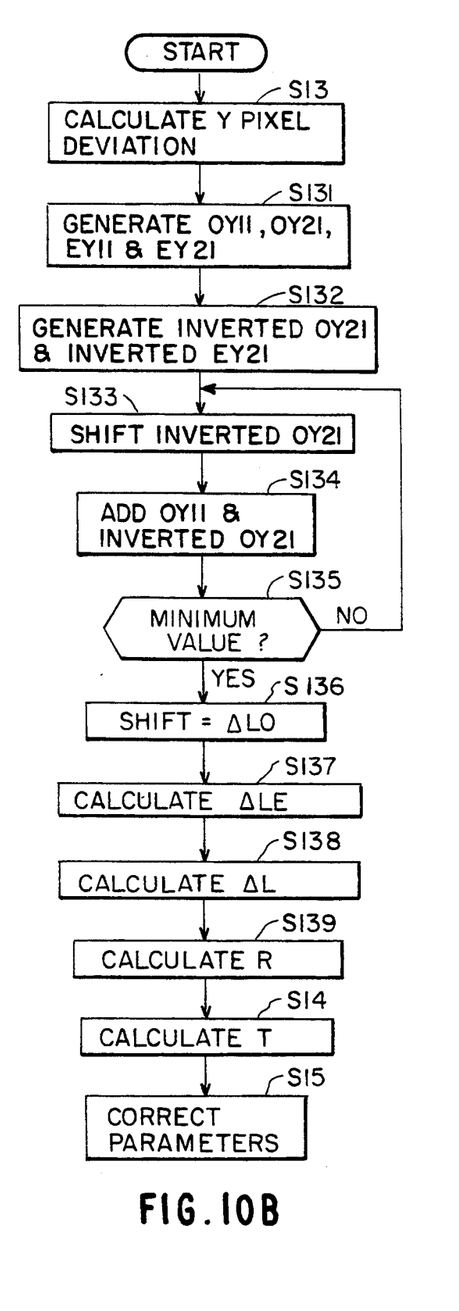
FIG. 10B is a flowchart showing a band-to-band pixel deviation calculating step included in FIG. 10A specifically; and FIG: 11 shows a slit-like light pattern projected onto the light-sensitive elements and having an angle $\theta$ relative to the array of pixels.

FIG. 10B demonstrates a sequence of steps for determining a pixel deviation R between bands in the direction of pixel arrangement (Y). As shown, the data processor 217 processes the correction data recorded in the HDDT 220 while distinguishing the data of the CCD array 174 and those of the CCD array 175. First, a deviation R is calculated by a procedure which will be described in detail (S13). Subsequently, a pixel deviation T between bands in the direction perpendicular to the direction of pixel arrangement is calculated (S14).

In accordance with the present invention, the correction of band-to-band registration is based on an optical vernier which is determined by the element pitch of the CCD array and the pitch of the lattice pattern of the projected image. The optical vernier will be described in detail hereinafter.

Figure 8:
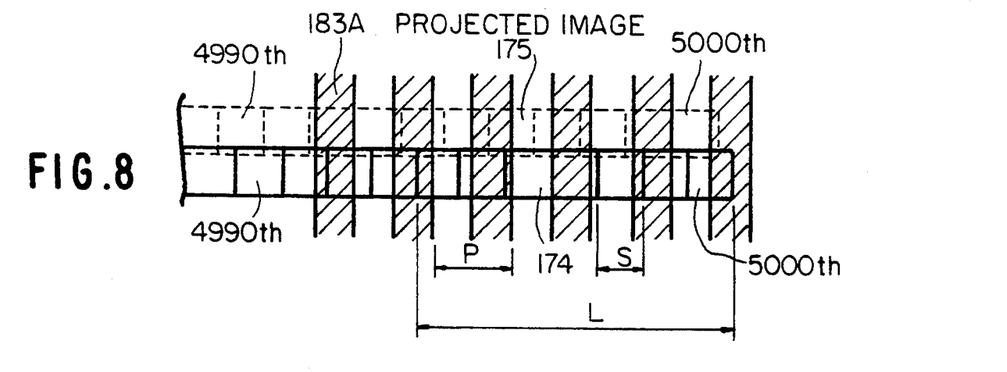
FIG. 8 shows registration patterns projected onto light-sensitive elements of associated bands.
Figure 9:
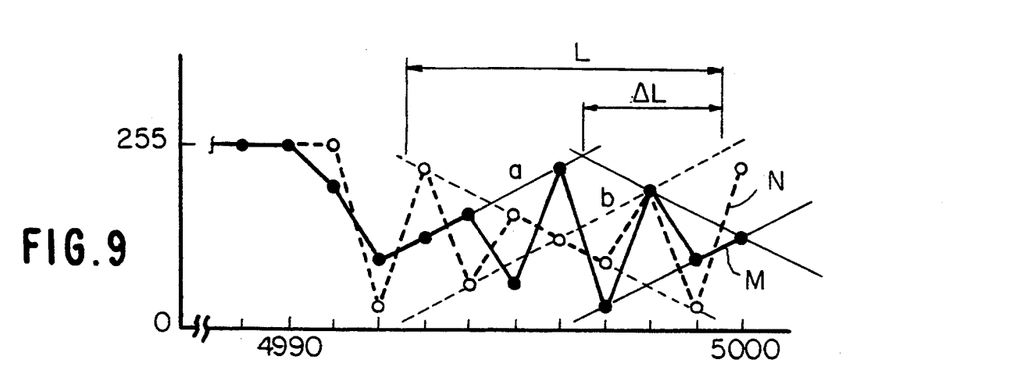
FIG. 9 plots the output levels of the light-sensitive elements of different bands produced in the condition shown in FIG. 8.

FIGS. 8 and 9 show the correction of band-to-band registration of the 4990th to 5000th light-sensitive elements of the CCD array 174, and those of the CCD array 175 by way of example. As shown, the image 183A of the pattern 183 projected from the correcting section 180 onto the light-sensitive surfaces of the CCD arrays 174 and 175 is a lattice pattern perpendicular to the direction in which the elements are arranged on the CCD arrays 174 and 175. The lattice pattern consists of stripe-like light portions and shadow portions having the same width which is slightly different from the element pitch. The output levels of the individual elements of the CCD arrays 174 and 175 are determined by the ratio of the area of the light portions and the area of the portions masked by the shadow portions as measured on the light-sensitive surfaces. Further, the output level changes periodically due to the deviation among the lattice pitch P which is the sum of the widths of the light portion and shadow portion adjoining each other, the element pitch S of the CCD arrays 174, and 175, and the positional deviation of the CCD arrays 174 and 175 in the direction of element arrangement.

The period L determined by the lattice pitch P is expressed as:

$$L = P \cdot n \quad (n \text{ being an integer}) \quad (1)$$

The period L is related to the element pitch S, as follows:

$$L = S \cdot m \quad (m \text{ being an integer}) \quad (2)$$

From the equations (1) and (2), L is the minimum length setting up:

$$n \cdot P / m \cdot S = 1 \quad (3)$$

For example, assume that the element pitch S is 7 microns, and the lattice pitch P is 12.25 microns. Then, from the equation (3), n is 4 (m is 7) and, therefore, the period L is 49 microns covering seven elements.

Subsequently, the outputs of the CCD arrays 174 and 175 are corrected with respect to sensitivity and dark portion output on an element basis, and then the theoretical value of each of the paired odd and even elements is determined. The theoretical value increases or decreases monotonously in correspondence with the element number. In FIG. 9, a solid line a and a dotted line b indicate respectively examples of the such lines associated with the odd elements and even elements.

The vernier has auxiliary graduations for reading a scale more minutely and produced by equally dividing u−1 graduations or u+1 graduations of a main scale into u, as well known in the art, Assuming that one graduation of the main scale has a distance s while one graduation of the vernier has a distance p, then the length l of the vernier is produced by:

$$l = u \cdot p - (ru + 1)s$$

where r is a small integer, generally 1 or 2.

The relation between the main scale and the vernier based on the lattice pitch P and element pitch S may be regarded such that the elements constitute the main scale while the light portions and shadow portions of the lattice constitute a vernier. Specifically, the graduation p of the above-mentioned vernier, the graduation s of the main scale, and u correspond respectively to one half of the lattice pitch P, i.e., P/2, the element pitch S, and 2n. Further, the period L of the output variation corresponds to the length l of the vernier. However, since the shadow portions do not contribute to the photoelectric conversion outputs of the elements, every other graduation in the main scale and vernier relation is valid.

Next, assume that the CCD arrays 174 an 175 having the same element pitch S are deviated from each other by R in the direction of element arrangement. In FIG. 9, a solid line M and a dotted line N plot respectively the output levels of the 4990th to 5000th elements of the CCD arrays 174 and 175. Such outputs are an 8-bit digital signal each and have levels ranging from 0 to 255 which are decimal versions of binary numbers, as stated earlier. Assume that the lines M and N are deviated by ΔL in the direction of element arrangement at, for example, the level 255. Then, the deviation R is expressed by use of the element pitch as a unit and based on the vernier theory, as follows:

$$R = (\Delta L / L) \cdot (P / 2S) \quad (4)$$

If the deviation R is zero, ΔL is zero, i.e., the lines M and N become a single line. Further, ΔL has either of two values depending on which of the greater element number and smaller element number is selected as a reference. In the illustrative embodiment, since ΔL corresponds to a deviation covering three element pitches as counted from the greater element number or four pitches as counted from the smaller element number, the deviation R is 0.375 from the former or 0.5 from the latter. On the other hand, the output level of each element depends on the ratio of the area of the light portion and the area masked by the shadow portion, as previously stated. It follows that when the output levels of the elements of the same number are compared, the difference in terms of the ratio is substantially proportional to the deviation R. Specifically, paying attention to the outputs of the 4991st elements of the CCD arrays 174 and 175 and assuming that the output level 255 of the CCD 175 is 1, then the Output level of the CCD 174 is 191 which is about three-fourths of the former. Since the output level of the 4992nd element of the CCD array 175 is 31, i.e., about 0.12, the deviation R is the intermediate between the element pitch of 0.025 and the element pitch of 0.38. Hence, it can be determined that the deviation R is 0.375. This deviation R is the correction value of band-to-band registration.

Figure 11:
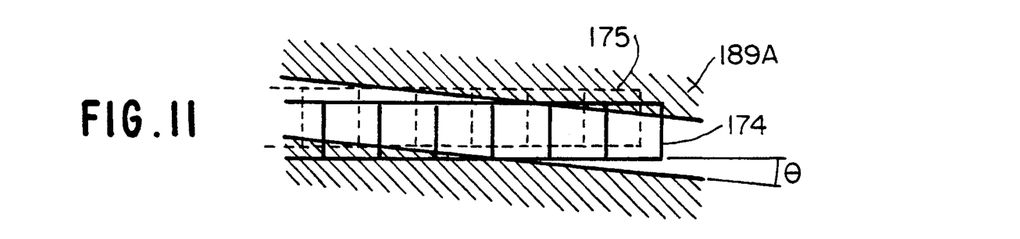

FIG. 11 demonstrates an example of the correction of band-to-band registration in the direction perpendicular to the direction of element arrangement. As shown, the projected image 189A of the correction pattern 189 is implemented as a slit-like pattern having an angle $\theta$ relative to the direction of element arrangement of the CCDs 174 and 175. Assume that the slit has a width equal to the element pitch S, i.e., 7 microns. Also, assume that none of the upper and lower edges of the slid masks the elements, e.g., assuming that the output level of each 4997th element is a reference value VC, the output levels of the 5000th elements are V1 and V2, respectively. Then, the deviation T of the CCD arrays 174 and 175 in the direction perpendicular to the direction of element arrangement is produced by:

$$T=(V1-V2)/VC \quad (5)$$

The unit of the deviation T is the size of the element in the perpendicular direction. Further, the CCDs 174 and 175 have respectively inclinations $\theta 1$ and $\theta 2$ relative to the direction of element arrangement which are expressed as:

$$\theta 1 = \{1-(V1/VC)\}S/4S \quad (6)$$

$$\theta 2 = \{1-(V2/VC)\}S/4S \quad (7)$$

Specifically, assuming that VC, Vi and V2 are respectively 256, 241 and 231, then the deviation T is 0.039 pixel pitch while the inclinations $\theta 1$ and $\theta 2$ are respectively 14.6 and 24.6 (mrad), i.e., 50 minutes and 84 minutes.

Referring to FIG. 10B, correction data DY1 and DY2 associated with the CCD arrays 174 and 175, respectively, and collected in the steps S3–S5 are individually separated into odd pixels and even pixels and arranged as data adapted for the conversion to an image. Specifically, the odd pixels are arranged in ascending order, i.e., 1, 3, 5, . . . , 4999 while the even pixels are also arranged in ascending order, i.e., 2, 4, 6, . . . , 5000 (S131). Let the odd ones of the two data sequences be OY 11 and OY21 and the even ones of the same be EY11 and EY21. The data of the pixels of OY21 are inverted to generate inverted OY 21 (S132). Then, the inverted OY21 data is shifted in the direction of piexel arrangement such that when the corresponding pixel data of OY11 and inverted OY 21 are added, all the pixels have the minimum level. In the illustrative embodiment, the above condition is satisfied if the inverted OY21 is shifted three pixel pitches to the left on the corresponding 4990th to 5000th data. This amount of shift is the deviation $\Delta$LO between the odd pixels (S133–S136). By the same procedure, a deviation $\Delta$LE between the even pixels is determined (S137). Subsequently, a mean of the deviations $\Delta$LO and $\Delta$LE, i.e., a deviation $\Delta$L between pixels is determined (S138). When the sum data is converted to an image, a substantially uniform image of low level is achieved regarding both of the odd and even data sequences. As a result, the residual portions different from the deviation $\Delta$L become extremely light and can be identified with ease. On the other hand, the period L is a constant determined by the lattice pitch P of the projected image 183A which is determined by the pitch of the lattice of the correction pattern P and the magnification of the CCD arrays 174 and 175, and the element pitch S of the CCDs 174 and 175. Hence, the correction value R of the band-to-band registration can be easily produced by the equation (4) (S139).

How to determine the band-to-band pixel deviation T in the direction (X) perpendicular to the direction of element arrangement in a step S14, is as follows. First, the correction data DX1 and DX2 of the CCD arrays 174 and 175, respectively, collected in the steps S6–S8 are each convened to an image. A particular element to be measured which is, in the illustrative embodiment, an element close to the 5000th clement and having the maximum level, i.e., the 4997th element is extracted to use the output thereof as a reference value VC for measurement. The levels of the 5000th pixels of the correction data DX1 and DX2 are measured w determine a deviation T by the equation (5). The measurement of these levels is conventional in the image processing art and, therefore, will not be described specifically. The correction values R and T of band-to-band registration are used to correct the geometric correction parameters for image processing stored in the data base 219 (S15).

Although the invention has been described with reference to a specific embodiment, this description is not meant to be construed in a limiting sense. Various modifications of the disclosed embodiment, as well as other embodiments of the invention, will become apparent with reference to the description of the invention. It is therefore contemplated that the appended claims will cover any modifications as fall within the true scope of the invention.

It is claimed:

1. An image mapping radiometer mounted on a craft flying over an object zone of the ground surface along an orbit having a predetermined relation with said object zone, and comprising first optics having in a visual field thereof a unit object zone defined by a predetermined width of said object zone and a distance in a flying direction of said craft and capable of dividing light rays of a frequency range including visible rays and infrared rays from said unit object zone into rays of a first spectral band and rays of a second spectral band and focusing said rays onto a first and a second focal plane, respectively, and first and second photoelectric transducer means located in said focal plane and each comprising an array of photoelectric transducer elements for detecting a radiance distribution of said rays of respective one of said first and second spectral bands in said focal plane, thereby sequentially picking up optical images in said first and second spectral bands of said unit object zone entering said visual field as said craft flies, said radiometer comprising:

correction pattern forming means comprising light source means for providing a light source, diffusing means for making uniform the light source of the light source means, and a movable mirror selectively movable into an optical path defined by the first optics, said correction pattern forming means forming on the first and second photoelectric transducer elements an optical image of a correction pattern in the form of a stripe pattern for determining whether or not said photoelectric transducer elements of said first and second photoelectric transducer means are aligned with each other in the first and second focal planes; and optical path switching means for controlling movement of said movable mirror into the optical path.

2. A radiometer as claimed in claim 1, wherein the optical image of said correction pattern is a pattern of a first correction optical image having a width substantially equal to a width of light-sensitive surfaces of the first and second optical transducer means and a length substantially equal to a length of the photoelectric transducer elements, said stripe pattern having a pitch slightly different from an element pitch at which said photoelectric transducer elements are arranged.

3. A radiometer as claimed in claim 1, wherein the optical image of said correction pattern is a pattern of a second correction optical image in the form of a stripe pattern extending at a predetermined angle relative to a direction in which the photoelectric transducers are arranged.

4. A radiometer as claimed in claim 1, wherein said optical path switching means moves said movable mirror to the outside of the optical path of the first optics when the unit object zone is imaged or moves said movable mirror into said optical path when said correction pattern is generated.

5. A image mapping radiometer mounted on a craft flying over an object zone of the ground surface along an orbit having a predetermined relation with said object zone, and comprising optics having in a visual field thereof an elongate unit object zone defined by a predetermined width of said object zone and a distance in a flying direction of said craft and extending in a direction of said width and capable of dividing light rays of a frequency range including visible rays and non-visible rays from said unit object zone into rays of a first spectral band and rays of a second spectral band and focusing said rays onto, respectively, a first and a second focal plane as a first and a second elongate optical image, and first and second optical transducer means respectively located in said first and second focal planes and each comprising a plurality of photoelectric transducer elements linearly arranged at a predetermined element pitch along associated one of said first and second optical images to convert said associated one of said first and second optical images to an electric signal, thereby sequentially picking up, as said craft flies, said optical images in said first and second spectral bands of said unit object zone as a series of said optical images corresponding to said unit object zone, said radiometer comprising:

optical image forming means for selectively forming an optical image of a repetitive stripe pattern having a pattern pitch and a width having a predetermined relation with the element pitch at a position where the first and second photoelectric transducer means are located, so that deviations of said first and second photoelectric transducer means from corresponding positions in said first and second focal planes may be detected, the optical image forming means including light source means for providing a light source, and diffusing means for making uniform the light source of the light source means; and means for calculating the deviations in response to outputs of the first and second photoelectric transducer means when said stripe pattern is formed.

6. A radiometer as claimed in claim 5, wherein the element pitch forming at least part of the photoelectric transducer means and the pattern pitch are related to each other as a main scale and a vernier, respectively, for increasing accuracy of calculation of the deviations.

7. A radiometer as claimed in claim 5, wherein said means for calculating deviations comprises means for comparing outputs of every other Photoelectric transducer element of said first photoelectric transducer means with outputs of corresponding Photoelectric transducer elements of said second photoelectric transducer means.

8. A radiometer as claimed in claim 5 or 7 wherein said optical image forming means for forming the optical image of said stripe pattern, and said means for calculating deviations, are driven by command signals sent from an earth station.

9. A radiometer as claimed in claim 7, wherein said means for forming the optical image of said stripe pattern, said means for calculating deviations, and said means for forming the optical image of said slit pattern are driven by command signals sent from an earth station.

10. A radiometer as claimed in claim 5, further comprising means for selectively forming at a position where said first and second photoelectric transducer means are located an optical image of a one-slit pattern having a slit orientation and a width having a predetermined relation with element orientations of said first and second photoelectric transducer means, so that deviations of said first and second photoelectric transducer means from said respective element orientations may be detected on the first and second focal planes.

11. A radiometer as claimed in claim 10, wherein said means for forming the optical image of said stripe pattern, said means for calculating deviations, and said means for forming the optical image of said slit pattern are driven by command signals sent from an earth station.

12. A radiometer as claimed in claim 10, wherein said optical image forming means for forming the optical image of said stripe pattern, said means for calculating deviations, and said means for forming the optical image of said one-slit pattern are driven by command signals sent from an earth station.

* * * * *

UNITED STATES PATENT AND TRADEMARK OFFICE
CERTIFICATE OF CORRECTION

PATENT NO. : 5,396,282
DATED : March 7, 1995
INVENTOR(S) : Kazuhiro Ogikubo

It is certified that error appears in the above-indentified patent and that said Letters Patent is hereby corrected as shown below:

Column 2, line 20, delete "MBSSR" and insert --MESSR--.

Column 12, line 9, delete "convened" and insert --converted--.

Signed and Sealed this

Twenty-second Day of August, 1995

Attest:

BRUCE LEHMAN

Attesting Officer         Commissioner of Patents and Trademarks